United States Patent [19]
Kuroki

[11] Patent Number: 6,104,104
[45] Date of Patent: Aug. 15, 2000

[54] UNINTERRUPTIBLE POWER SUPPLY APPARATUS

[75] Inventor: Kazuo Kuroki, Tokyo, Japan

[73] Assignee: Fuji Electric Co., Ltd., Kawasaki, Japan

[21] Appl. No.: 09/227,536

[22] Filed: Jan. 11, 1999

[30] Foreign Application Priority Data

Feb. 9, 1998 [JP] Japan ................................. 10-027021

[51] Int. Cl.⁷ ...................................................... H02J 7/00
[52] U.S. Cl. .................................. 307/66; 307/43; 307/64
[58] Field of Search ...................................... 307/64.66, 43, 307/46, 80, 85–87, 22, 26; 363/34, 37

[56] References Cited

U.S. PATENT DOCUMENTS 5,229,650  7/1993  Kita et al. ................................. 307/66

*Primary Examiner*—Josie Ballato
*Assistant Examiner*—Sharon Polk
*Attorney, Agent, or Firm*—Kaensaka & Takeuchi

[57] ABSTRACT

An uninterruptible power supply apparatus includes a storage battery for providing a DC voltage, a switch for switching from an AC power source for providing an AC voltage to the storage battery, and an AC-stabilizing circuit connected to an output side of the switch. The AC-stabilizing circuit performs an AC/AC conversion or a DC/AC conversion in response to a switching operation of the switch in order to output an AC voltage therefrom. Namely, for a commercial power supply, the AC-stabilizing circuit supplies a stable AC voltage despite variations in power supply voltage. The size of the apparatus is reduced, and its service life is prolonged.

8 Claims, 6 Drawing Sheets

UNINTERRUPTIBLE POWER SUPPLY APPARATUS

BACKGROUND OF THE INVENTION AND RELATED ART STATEMENT

The present invention relates to a circuit configuration for an uninterruptible power supply apparatus for computers and so on, and in particular, an uninterruptible power supply apparatus based on a common commercial power supply type or method that supplies power from a commercial power supply in a normal circumstance and supplies power from a storage battery to a load through a power conversion circuit if a problem occurs with the commercial power supply.

FIG. 7 shows a circuit configuration (single-wire diagram) based on the conventional common commercial supply power method. In this method, a commercial-power-supply voltage input through an AC input terminal is normally output directly from an AC output terminal via a switch 1, while a charger 3 charges electricty to a storage battery 2 to provide backup power in case of problems with the commercial power supply.

When an error occurs in the commercial power supply, such as a service interruption or decrease or increase in voltage, the switch 1 is instantaneously switched to an inverter 21 side to supply AC power from the storage battery 2 through the inverter 21, thereby achieving uninterrupted power supply (magazine "OHM", February 1989, pp.33).

Since the conventional uninterruptible power supply apparatus directly feeds power to a load through the switch 1 during the normal commercial power supply, there are following problems.

(1) Since the variation of the commercial power supply voltage directly affects the load, an error in the commercial power supply must be detected as quickly as possible in order to switch to the inverter 21 side. That is, the effect of the voltage variation of the commercial power supply must be minimized.

(2) The power conversion circuit, which is composed of the charger 3 and the inverter 21, includes a DC intermediate circuit, which is composed of an AC/DC conversion circuit (converter) and a DC/AC conversion circuit (inverter). Thus, an electrolytic capacitor is required as a DC input voltage power supply for the inverter, resulting in increasing an apparatus size and considering the expected service life of the capacitor.

Thus, an object of the invention is to provide an uninterruptible power supply apparatus that avoids the direct effect onto a load due to a change of a voltage in the commercial power supply during the normal commercial power supply, while eliminating a DC intermediate circuit when power is supplied from the storage battery, thereby stabilizing the voltage supply to the load, reducing the apparatus dimensions, and increasing the service life.

SUMMARY OF THE INVENTION

To achieve this object, the apparatus of the invention supplies, during a normal commercial power supply, a power to a load through an AC-stabilizing circuit that uses an AC chopper, while upon interruption of the commercial power supply, a storage battery is connected to the AC input side of the AC-stabilizing circuit to convert a DC voltage from the storage battery to an AC voltage and to supply it to the load.

That is, during the normal supply, the AC-stabilizing circuit stabilizes AC voltage of the commercial power supply; and upon service interruption of the commercial power supply, the AC-stabilizing circuit acts as an inverter to supply an AC voltage to the load.

The uninterruptible apparatus of the invention according to a first aspect comprises a switch for switching between an AC voltage and a DC voltage from a storage battery in response to a normal or abnormal AC voltage characteristic; and an AC-stabilizing circuit connected to the output side of the switch to execute AC/AC conversion or DC/AC conversion in response to a switching operation in order to output an AC voltage.

The invention set forth in a second aspect provides the uninterruptible power supply apparatus according to the first aspect, wherein the AC-stabilizing circuit comprises parallel circuits that include first to third serial arms, each arm including two semiconductor switching elements connected in series, one diode being connected inversely in parallel to each semiconductor switching element; a filter capacitor connected parallel to the parallel circuits; and an AC reactor, one end of which is connected to a middle connection point of the first serial arm, and wherein the switch includes one switching contact connected to one of the AC input terminals, the other switching contact connected to the storage battery and a common terminal connected to the other end of the AC reactor. The other AC input terminal is connected to a middle connection point of the second serial arm. The middle connection point of the second serial arm and a middle connection point of the third serial arm are connected to a pair of AC output terminals via an output AC filter.

The invention set forth in a third aspect provides the interruptive power supply apparatus according to the first aspect, wherein the AC-stabilizing circuits comprises parallel circuit including first to third serial arms, each arm including two semiconductor switching elements connected in series, one diode being connected inversely in parallel to each semiconductor switching element; a filter capacitor connected parallel to the parallel circuit; and an AC reactor, one end of which is connected to a middle connection point of the first serial arm, and wherein the switching includes one switching contact connected to one of the AC input terminals, the other switch contact connected to the storage battery, and a common terminal connected to the other end of the AC reactor. The other AC input terminal is connected to a middle connection point of the second serial arm. The middle connection point of the second serial arm and a middle connection point of the third serial arm are connected to a pair of AC output terminals.

The invention set forth in a fourth aspect provides the uninterruptible power supply apparatus according to the first aspect, wherein the AC-stabilizing circuits comprises parallel circuits including first to third serial arms, each arm including two semiconductor switching elements connected in series, one diode being connected inversely in parallel to each semiconductor switching element; and an AC reactor, one end of which is connected to a middle connection point in the first serial arm, and wherein the switch includes one switching contact connected to one of the AC input terminals, the other switching contact connected to the storage battery, and a common terminal connected to the other end of the AC reactor. The other AC input terminal is connected to a middle connection point of the second serial arm, one end of a filter capacitor, and one of the AC output terminals. A middle connection point of the third serial arm is connected to the other end of the filter capacitor and the other AC output terminal.

In the invention, when the AC input voltage is normal, this voltage is converted into a DC voltage by the charger to charge electricity to the storage battery. In this case, the charger is connected between the storage battery and the AC input or output terminal or one end of any of the first to third serial arms.

DETAILED DESCRIPTION OF PREFERRED EMBODIMENTS

Figure 1:
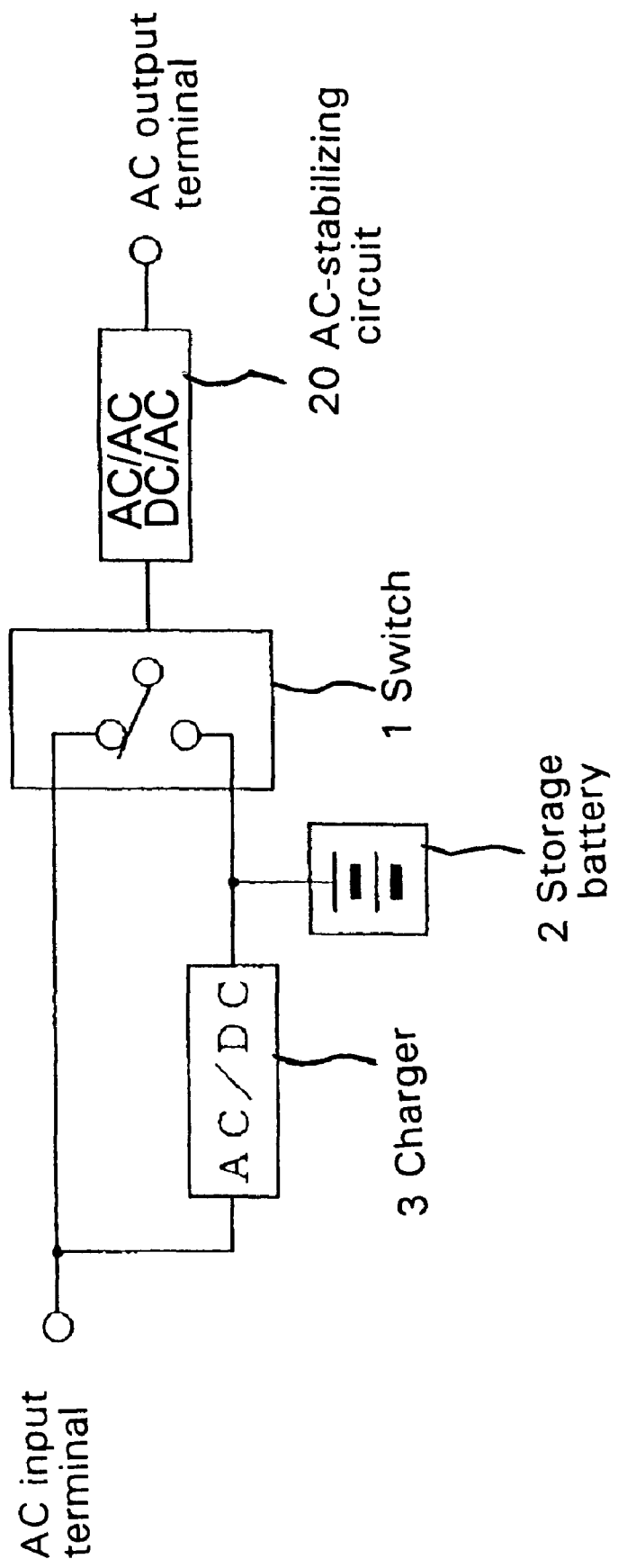
FIG. 1 is a circuit diagram showing a first embodiment of the invention.

Embodiments of the invention are described below with reference to the drawings. FIG. 1 shows a single-wire diagram of a first embodiment of this invention.

In FIG. 1, one of switching contacts of a switch 1 is connected to an AC input terminal, and the other of the switching contacts is connected to the AC input terminal via a charger (AC/DC conversion circuit) 3. A storage battery 2 is connected to the DC output side of the charger 3, and an AC-stabilizing circuit 20 is connected to the output side of switch 1. Also, the output side of the AC-stabilizing circuit is connected to an AC output.

In this configuration, when the commercial power supply connected to the AC input terminal is normal, the voltage of the commercial power supply is converted into an AC output voltage for an apparatus via the switch 1 and the AC-stabilizing circuit 20. In this case, the storage battery 2 is charged by the charger 3.

When an error, such as service interruption or decrease or increase in voltage, occurs in the commercial power supply, the switch 1 is switched to the storage battery 2 side, and instantaneously, the AC-stabilizing circuit 20 operates as an inverter to output an AC voltage. In such a configuration, the switch 1 may be composed of a mechanical switch or a semiconductor switch.

Although in this embodiment, the charger 3 is connected between the AC input terminal and the storage battery 2, the charger 3 may be connected between the storage battery 2 and the input or output side of the AC-stabilizing circuit 20.

Figure 2:
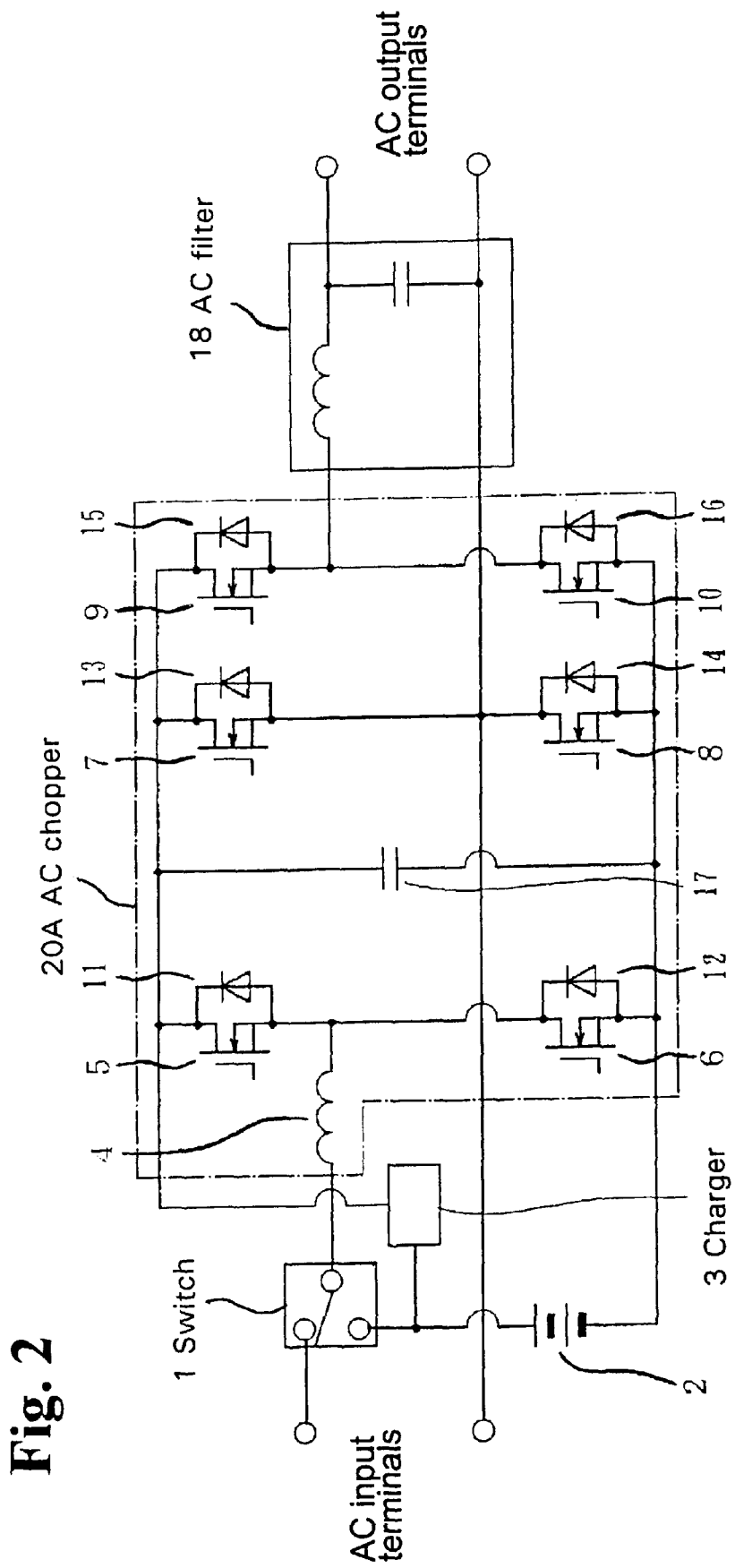
FIG. 2 is a circuit diagram showing a second embodiment of the invention.

FIG. 2 shows a second embodiment of the invention. This embodiment uses an AC chopper 20A, as the AC-stabilizing circuit 20 shown in FIG. 1.

In the AC chopper 20A, diodes 11 and 12 are connected inversely parallel to respective semiconductor switching elements (MOSFET) 5 and 6, which are connected to form a first serial arm. Likewise, switching elements 7 and 8 and diodes 13 and 14 constitute a second serial arm, and switching elements 9 and 10 and diodes 15 and 16 constitute a third serial arm. The first to third serial arms are connected parallel, a filter capacitor 17 is connected to both ends of the parallel circuits, and one end of an AC reactor 4 is connected to a middle connection point of the first serial arm.

The other end of the AC reactor 4 is connected to one of the AC input terminals via a common terminal of a switch 1 and one of switching contacts. In addition, the other of the AC input terminals and one of the input sides of an output AC filter 18 are connected to a middle connection point of the second serial arm. Furthermore, the other of the input sides of the output AC filter 18 is connected to a middle connection point of the third serial arm. The output AC filter 18 is composed of a reactor and a capacitor.

The storage battery 2 is connected between the other of the switching contacts of the switch 1 and one common connection point for the first to third serial arms, and a charger 3 is connected between the storage battery 2 and the other common connection point for the first to third serial arms.

Figure 6:
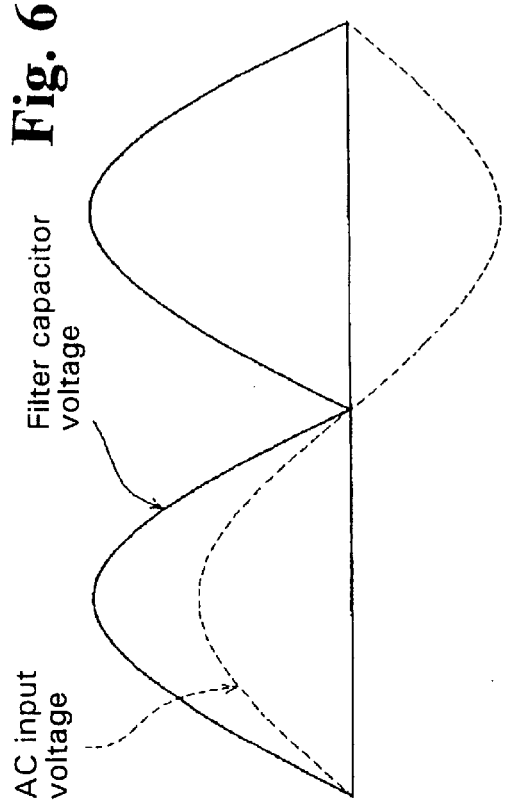
FIG. 6 is a waveform chart showing an AC input and a filter capacitor voltage in the embodiment.
Figure 7:
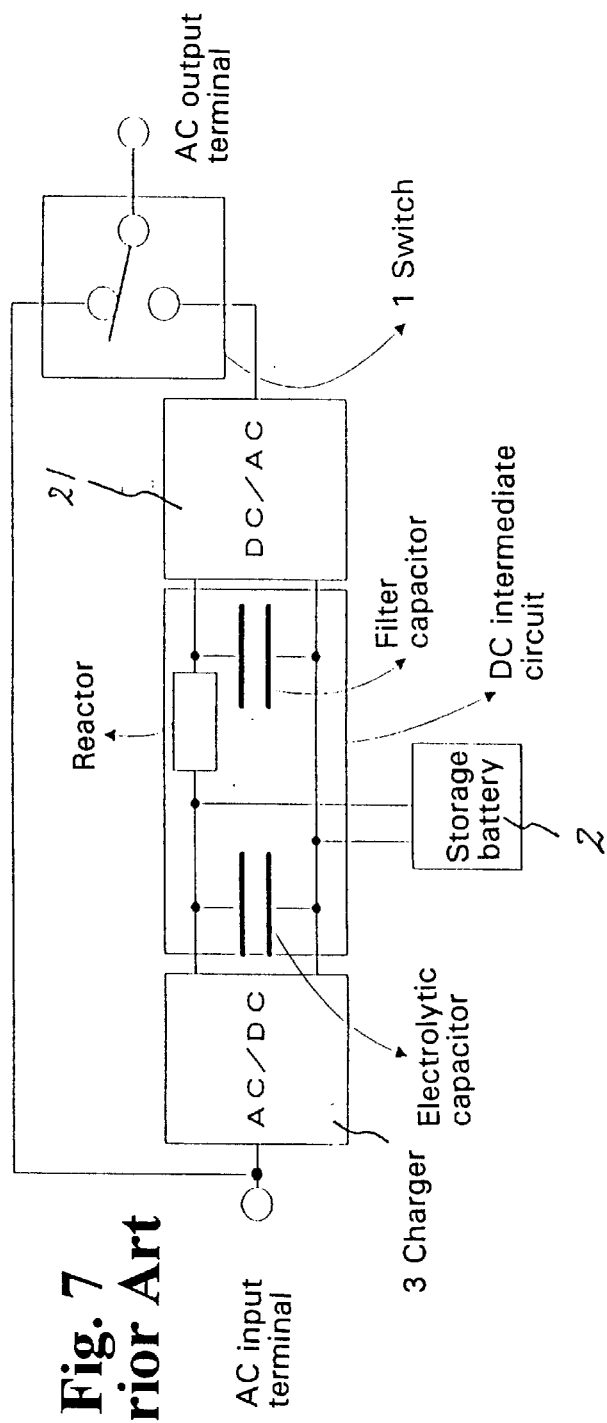
FIG. 7 is a circuit diagram showing a conventional technique.

In this configuration, if the AC input voltage from the commercial power supply falls below a predetermined value, the switching elements 7 to 10 of the second and third serial arms are turned on and off at the frequency of the AC input voltage, and the switching elements 5 and 6 of the first serial arm are turned on and off at a higher frequency. Thus, the filter capacitor 17 produces a single-phase full-wave rectified waveform having a larger amplitude than that of the AC input voltage, as shown in FIG. 6. By turning the switching elements 7 to 10 on and off when the voltage of the single-phase full-wave rectified waveform is zero, an AC voltage of a sine wave can be obtained from the AC output terminals. In this case, the AC filter 18 serves to remove the higher frequency ripples.

In addition, if the AC input voltage is higher than a predetermined value, the switching elements 5 to 8 of the first and second serial arms are turned on and off at the frequency of the AC input voltage, whereas the switching elements 9 and 10 of the third serial arm are turned on and off at a higher frequency. At this time, the filter capacitor 17 produces a single-phase full-wave rectified waveform having an amplitude almost equal to that of the AC input voltage. The output side of the AC filter 18 produces an AC voltage of a sine wave having an amplitude smaller than that of the AC input voltage. While the commercial power supply is normal, the charger 3 that executes AC/DC conversion charges electricity to the storage battery 2.

Despite the variation of the AC input voltage, this embodiment can produce a stabilized AC voltage of a sine waveform from the AC output terminals.

When the AC input voltage increases beyond a predetermined voltage or is interrupted, the switch 1 is switched to the storage battery 2 side to turn the switching elements 7 to 10 of the second and third serial arms on and off at the frequency of the AC input voltage, while turning the switching elements 5 and 6 of the first serial arm on and off at a higher frequency. The filter capacitor 17 then produces a waveform almost identical to the voltage waveform of the filter capacitor shown in FIG. 6, and an AC voltage of a sine wave can be obtained from the AC output terminals through the AC filter 18. That is, the AC chopper 20A acts as an inverter to prevent interruption of the power supply.

Of course, in the above configuration, a mechanical switch or a semiconductor switch may be used as the switch 1. In addition, the charger 3 may be inserted between the AC input or output terminal and the storage battery 2.

Figure 3:
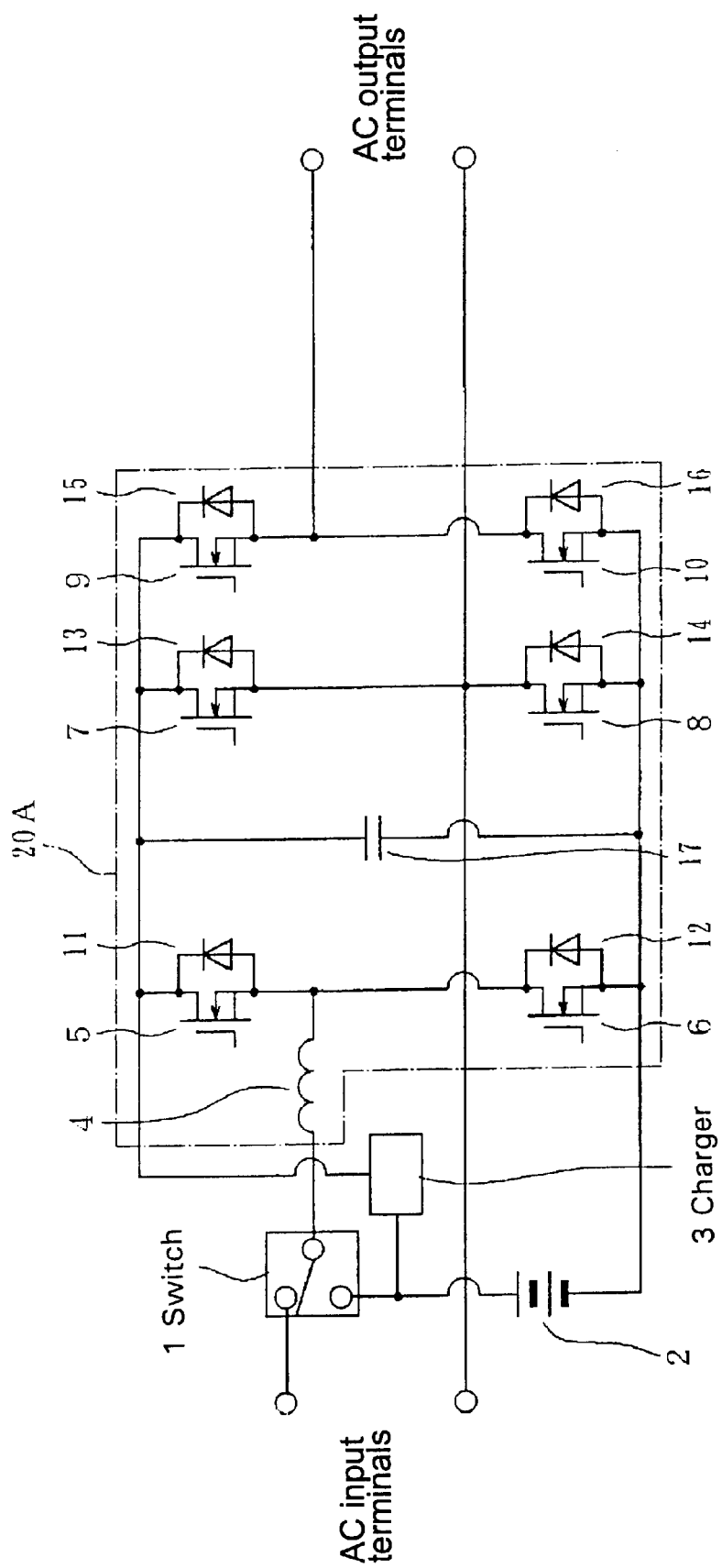
FIG. 3 is a circuit diagram showing a third embodiment of the invention.

FIG. 3 shows a third embodiment of the invention. This embodiment differs from the embodiment shown in FIG. 2 in that the AC output circuit does not include the AC filter 18.

In this configuration, if the AC input voltage falls below a predetermined value, the switching elements 7 to 10 of the second and third serial arms are turned on and off at the frequency of the AC input voltage, while the switching elements 5 and 6 of the first serial arm are turned on and off at a higher frequency, as explained in the second embodiment shown in FIG.2, in order to increase the AC output voltage as shown by the waveform in FIG. 6. However, this configuration is unable to reduce the AC output voltage to a value lower than that of the AC input voltage if the AC input voltage exceeds a predetermined value.

Figure 4:
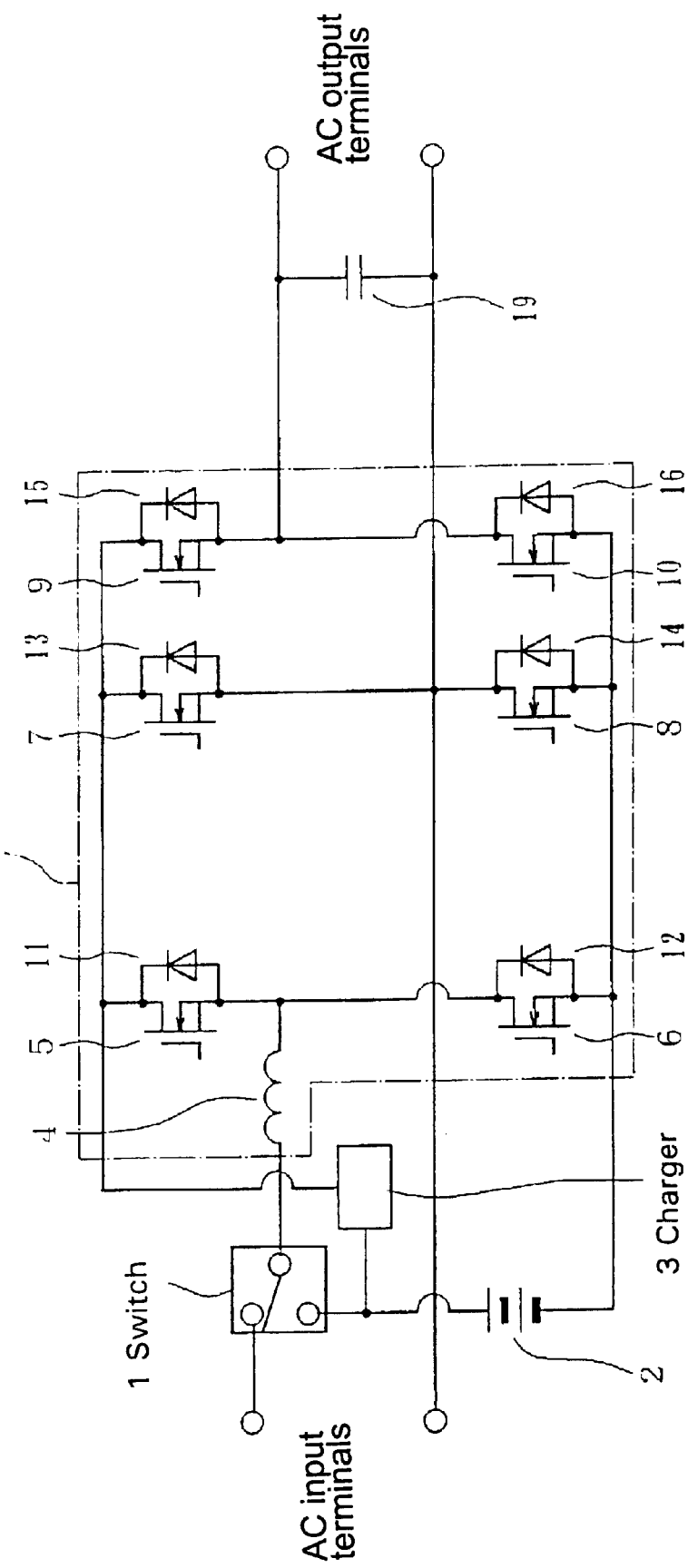
FIG. 4 is a circuit diagram showing a fourth embodiment of the invention.

FIG. 4 shows a fourth embodiment of the invention. This embodiment differs from the embodiment in FIG. 3 in that a filter capacitor 19 is provided in the AC output circuit. An AC chopper 20B is composed of first to third serial arms consisting of switching elements 5 to 10 and diodes 11 to 16.

The operation of this circuit is the same as in FIG. 3, but a waveform of each of the currents flowing through the switching elements 7 to 10 contains more ripples.

Figure 5:
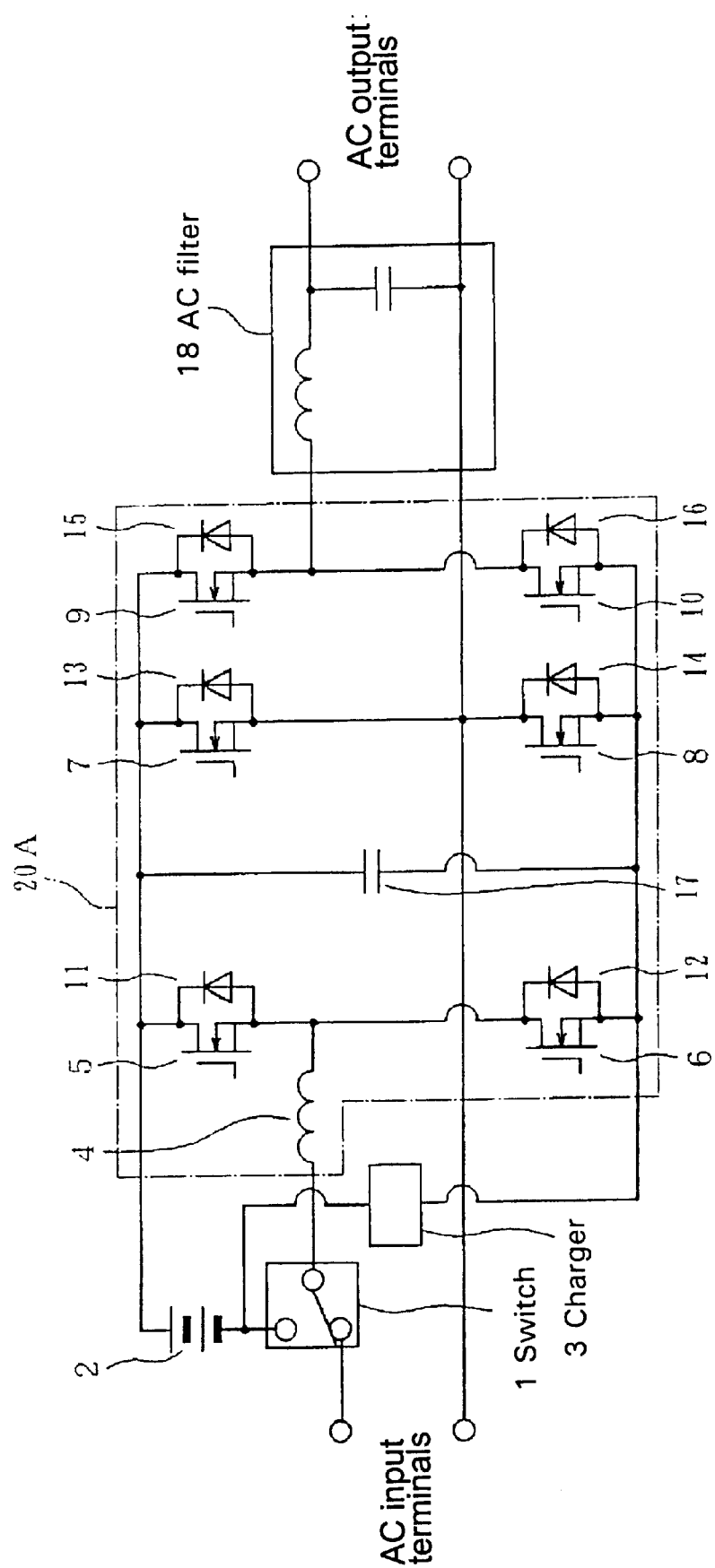
FIG. 5 is a circuit diagram showing a modified embodiment of the invention set forth in the second embodiment.

FIG. 5 shows a modified example of the second embodiment of the invention. This embodiment differs from the embodiment shown in FIG. 2 in the connections of the storage battery 2 and the charger 3. That is, in the embodiment in FIG. 2, the negative electrode of the storage battery 2 is connected to one end of the filter capacitor 17 (one end of the parallel circuit formed of the first to third serial arms) and the positive electrode of the storage battery is connected to the other end of the filter capacitor 17 via the charger 3 (the other end of the parallel circuit), but in the embodiment in FIG. 5, the positive electrode of the storage battery 2 is connected to the other end of the filter capacitor 17 and the negative electrode of the storage battery is connected to the one end of the filter capacitor 17 via the charger 3. The operation of the entire circuit is the same as in the embodiment shown in FIG. 2.

In the embodiments shown in FIGS. 3 and 4, the charging circuit for the storage battery 2 may also have a similar configuration.

As described above, this invention normally uses the AC-stabilizing circuit consisting of an AC chopper to stabilize an AC input voltage in order to produce an AC output voltage for an apparatus, so that a stable AC voltage is supplied to the load despite the variations in the power supply voltage. In addition, if the power supply voltage becomes excessively high or service interruption occurs, the AC-stabilizing circuit acts as an inverter to output a stable AC voltage, thereby eliminating the frequent switching to the storage battery side and reducing the number of discharge time from the storage battery to enable stable operation.

Furthermore, the AC-stabilizing circuit can be configured as an AC chopper that requires no DC intermediate circuit, thereby obviating the need for parts, such as an electrolytic capacitor with limited service life. This allows the apparatus to be reduced in size and to increase the service life.

What is claimed is:

1. An uninterruptible power supply apparatus comprising:

a storage battery for providing a DC voltage;

a switch having input terminals connected to an AC power source for providing an AC voltage and the storage battery, and an output terminal, said switch connecting one of the input terminals to the output terminal; and an AC-stabilizing circuit connected to the output terminal of the switch and being formed of an AC chopper having a function of a DC/AC converter, said AC-stabilizing circuit performing an AC/AC conversion when the output terminal is connected to the AC power source or a DC/AC conversion by the function of the DC/AC converter when the output terminal is connected to the storage battery, to thereby output a constant AC voltage therefrom.

2. An uninterruptible power supply apparatus according to claim 1, wherein said AC-stabilizing circuit comprises parallel circuits including first to third serial arms, each of the first to third serial arms being formed of two semiconductor switching elements connected in series and two diodes, each diode being connected inversely in parallel to each semiconductor switching element; and an AC reactor, one end of which is connected to a middle connection point of the first serial arm; and said switch includes a first contact connected to one of AC input terminals of the AC power source, a second contact connected to the storage battery, and the output terminal connected to the other end of said AC reactor, the other of the AC input terminals being connected to a middle connection point of the second serial arm, said middle connection point of the second serial arm and a middle connection point of the third serial arm being connected to a pair of AC output terminals.

3. An uninterruptible power supply apparatus to claim 2, wherein said AC-stabilizing circuit further includes a filter capacitor connected parallel to the parallel circuits.

4. An uninterruptible power supply apparatus according to claim 3, further comprising an output AC filter connected between the pair of the AC output terminals.

5. An uninterruptible power supply apparatus according to claim 2, further comprising a filter capacitor having ends connected to the pair of the AC output terminals.

6. An uninterruptible power supply apparatus according to claim 2, wherein said first to third serial arms have first and second common connection points, said storage battery is connected between the second contact and the first common connection point, and a charger is connected between the storage battery and the second common connection point.

7. An uninterruptible power supply apparatus according to claim 1, wherein said switch changes a connection of the input terminal connected to the AC power supply to the input terminal connected to the storage battery if an AC input voltage is higher than a predetermined value or is interrupted.

8. An uninterruptible power supply apparatus according to claim 1, wherein when an AC voltage supplied to the AC-stabilizing circuit is above or below predetermined AC voltages, the AC chopper provides a voltage within said predetermined voltages.

* * * * *